June 19, 1923. 1,458,998
H. SLETTO
PUMPKIN PEELING MACHINE
Filed Aug. 1, 1922 3 Sheets-Sheet 1
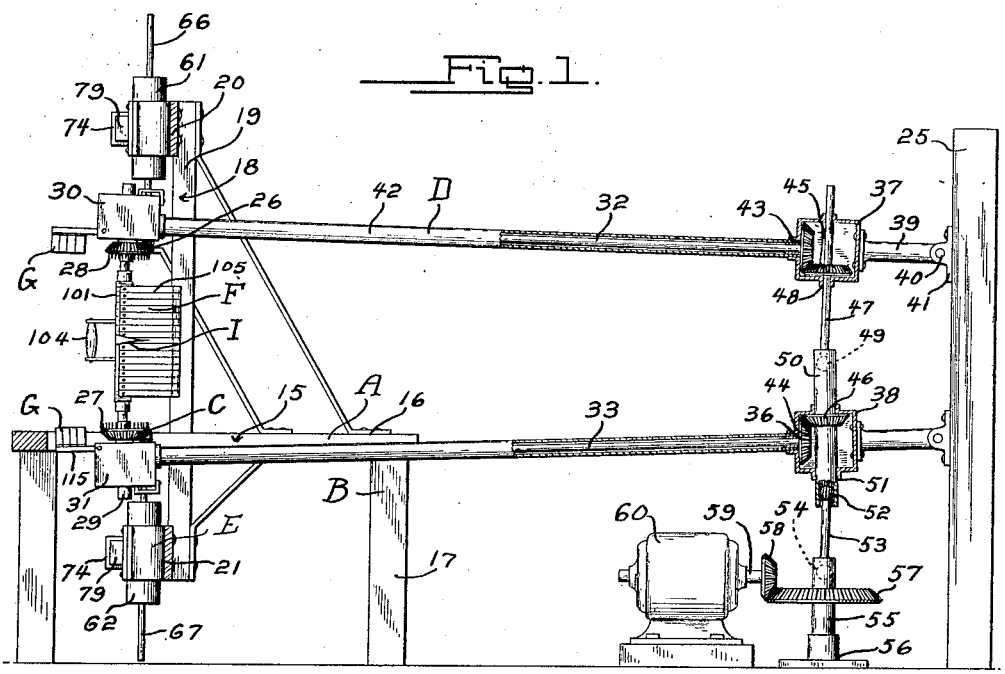
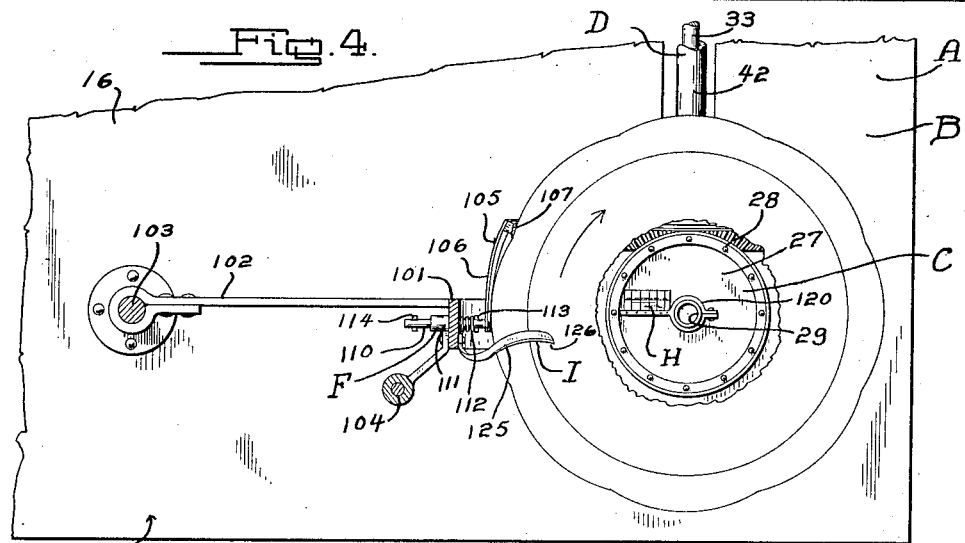
Inventor
Henry Sletto

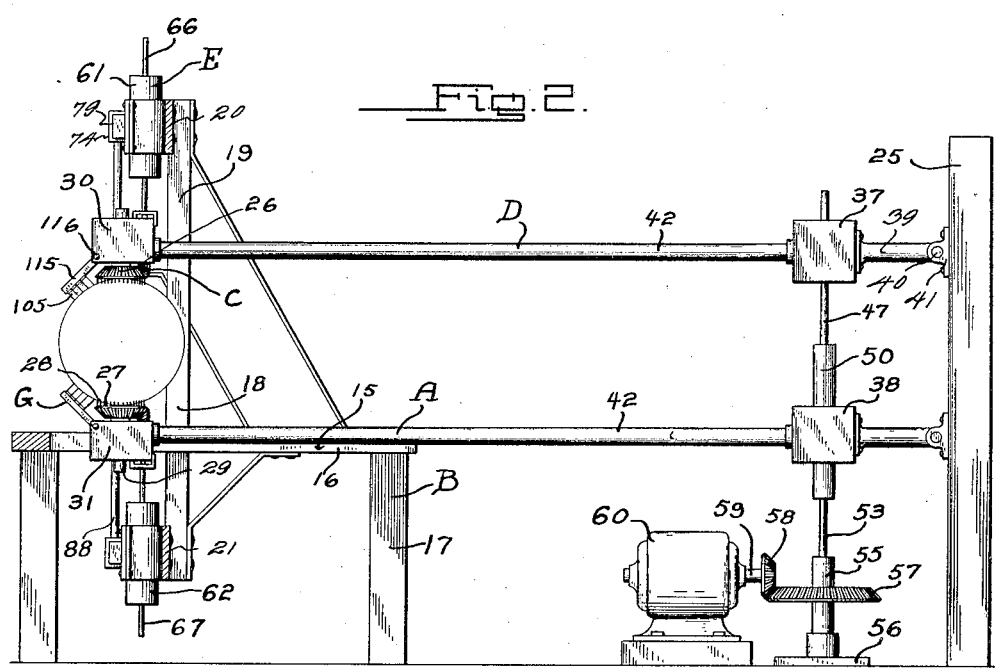
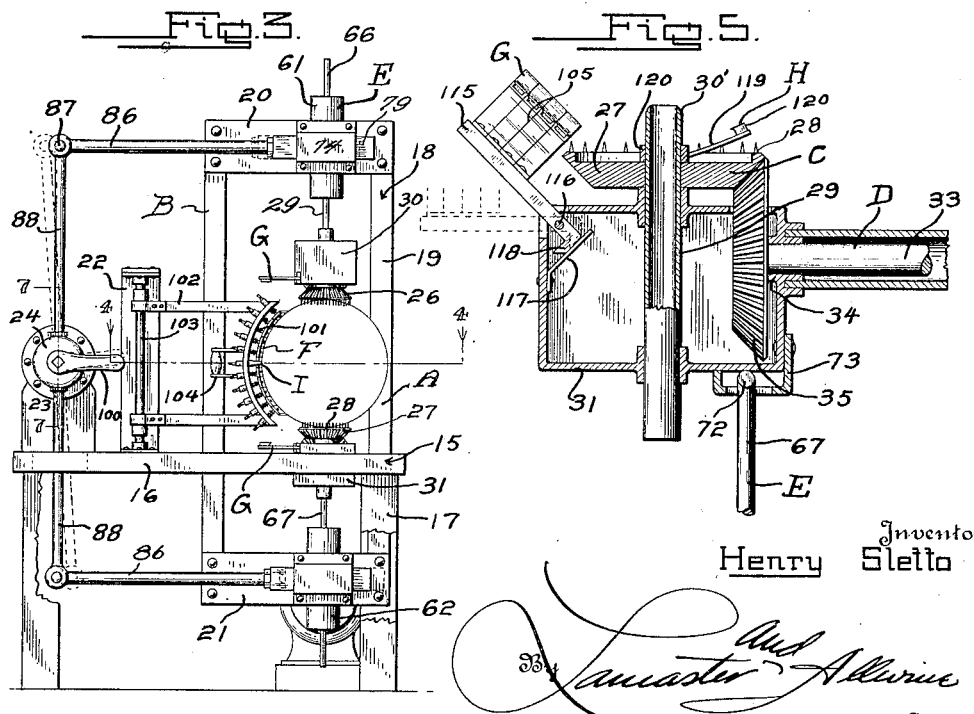

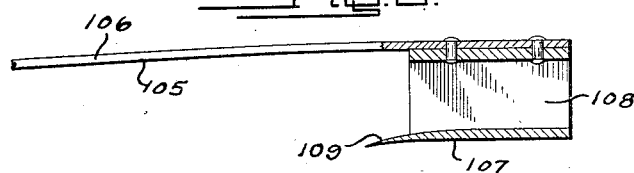
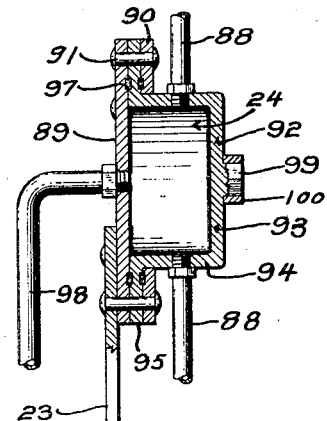
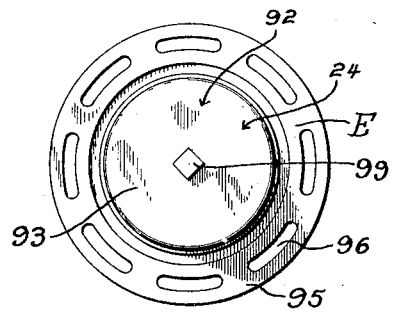
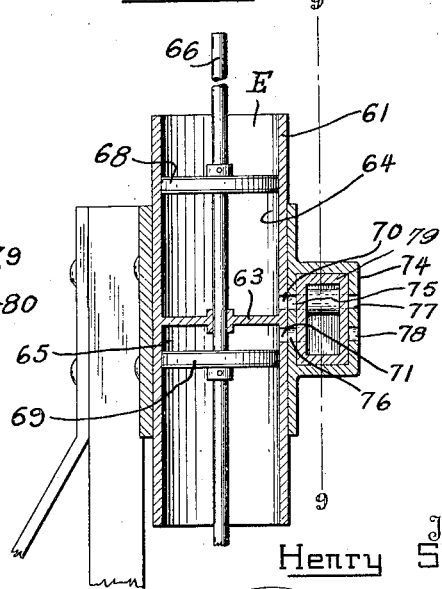
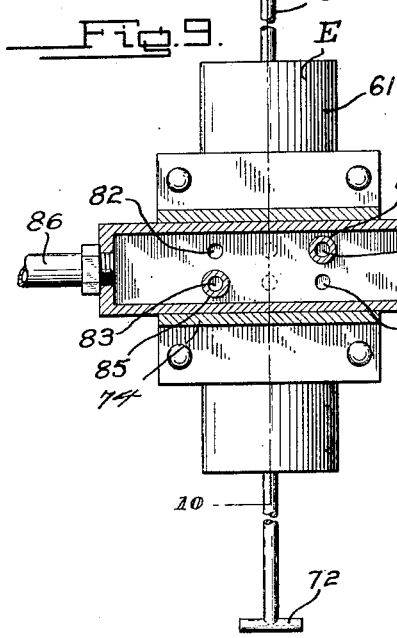

Patented June 19, 1923.

1,458,998

UNITED STATES PATENT OFFICE.

HENRY SLETTO, OF ATASCADERO, CALIFORNIA.

PUMPKIN-PEELING MACHINE.

Application filed August 1, 1922. Serial No. 579,007.

*To all whom it may concern:*

Be it known that I, HENRY SLETTO, a citizen of the United States, residing at Atascadero, in the county of San Luis Obispo and State of California, have invented certain new and useful Improvements in Pumpkin-Peeling Machines, of which the following is a specification.

This invention relates to vegetable or fruit peeling devices, and the primary object of the invention is to provide a novel machine for automatically peeling and halving pumpkins, so as to eliminate the difficulties and the time contingent with the peeling and the halving of pumpkins by hand.

A further object of the invention is to provide novel adjustable means for rotating and holding the pumpkin during the peeling and halving operation, this means being adjustable so as to effectively hold and rotate different sized pumpkins.

A further object of the invention is to provide novel means for gripping and rotating the pumpkins during the peeling and halving operation embodying a pair of rotatable gear wheels carrying pins for engaging the pumpkins, novel means for rotating the gears and novel means for forcing the gears toward and away from the pumpkins, said means for forcing the gears toward and away from the pumpkins embodying pneumatically operated pistons.

A further object of the invention is to provide novel peeling knives for engaging all parts of the pumpkin, so that the entire pumpkin will be effectively peeled, said knives being resiliently mounted so that the same will conform to the various configurations of the pumpkin.

A further object of the invention is to provide a stationary peeling structure embodying a plurality of resilient peeling knives for engaging the major portion of the pumpkin being peeled and pivoted peeling sections embodying a plurality of peeling knives, movable from the gear wheels toward and away from the pumpkin for peeling that portion of the pumpkin lying between the main peeling section and the gear wheels.

A further object of the invention is to provide a novel peeling section embodying peeling knives located within the periphery of the gear wheels which engage the pumpkins so that the portions of the pumpkins engaged by the gear wheels will also be effectively peeled.

A further object of the invention is to provide a novel halving device carried by the main peeling section which is brought into and out of operative position in relation to the pumpkin during the movement of the main peeling section into and out of engagement with the pumpkin.

A further object of the invention is to provide a novel single unitary means for controlling the ingress and egress of pressure to the cylinders in which the pistons carrying the gear wheels are located, so as to effectively bring the gear wheels toward and away from the pumpkins.

A still further object of the invention is to provide an improved pumpkin peeling and halving machine of the above character, which will be durable and efficient in use, one which will be simple and easy to manufacture and one which can be placed upon the market at a reasonable cost.

With these and other objects in view the invention consists in a novel construction, arrangement and formation of parts, as will be hereinafter more specifically described, claimed and illustrated in the accompanying drawings, forming a part of this specification, in which drawings—

Figure 1 is a side elevation of the improved pumpkin peeling and halving machine with parts thereof in section, the machine being shown in operative position for receiving a pumpkin.

Figure 2 is a side elevation of the improved machine with the supporting table shown in vertical longitudinal section, the machine being in operative position with a pumpkin in position to be peeled and halved.

Figure 3 is a front elevation of the improved pumpkin peeling and halving machine with a pumpkin in position for being peeled and halved.

Figure 4 is a fragmentary enlarged horizontal section through the improved machine taken on the line 4—4 of Figure 3, showing the main peeling section in position for peeling a pumpkin.

Figure 5 is an enlarged vertical detail section through the lower pumpkin supporting member, showing the movable end peeling section carried thereby, the end peeling section being in operative position.

Figure 6 is an enlarged detail longitudinal section through one of the peeling knives, of one of the peeling sections.

Figure 7 is an enlarged detail vertical section through the pressure head taken on the line 7—7 of Figure 3.

Figure 8 is a detail elevation of the pressure distributing head.

Figure 9 is a detail section taken on the line 9—9 of Figure 10 illustrating the upper cylinder and piston rod for moving the upper pumpkin engaging member toward and away from the pumpkin.

Figure 10 is a longitudinal section through the same taken on the line 10—10 of Figure 9.

Referring to the drawings in detail, wherein similar reference characters designate corresponding parts throughout the several views, the letter A generally indicates the improved peeling and halving machine which includes a frame B; the pumpkin holding and grasping means C; the means D for rotating the pumpkin holding and grasping means; the means E for moving the pumpkin holding and grasping means toward and away from the other; the peeling means F, G and H; and the halving means I.

The frame B includes a table 15 consisting of a top 16 and corner supporting legs 17. This table 15 is adapted to support the various parts of the improved peeling and halving machine and the pumpkins to be peeled and halved are adapted to be laid upon this table. It is to be understood that the pumpkins can be fed onto the table 15 in any preferred manner such as by a conveyor or the like (not shown) and the peeled and halved pumpkins can be carried away from the table by another conveyor (not shown) if so desired. The rear edge of the table 15 supports a vertically disposed frame 18 for supporting a part of the means for moving the pumpkin grasping and holding means toward and away from each other. This vertically disposed frame includes the side posts 19 and the upper and lower plates 20 and 21. Secured in spaced relation to the vertically disposed frame 18, the table 15 has secured thereto a supporting post 22 which acts as a support for the main peeling device F and the halving device I. A second supporting post 23 is secured to the table 15 in spaced relation to the post 22 and this post 23 forms means for supporting the distributing head 24, which will be hereinafter more fully described, of the means for moving the pumpkin grasping means toward and away from each other.

Disposed in rear of and in spaced relation to the table 15 is a main supporting post 25, the purpose of which will also be hereinafter more fully described.

The pumpkin holding and grasping means C consists of upper and lower beveled pinions 26 and 27 which have their inner surfaces adjacent to their peripheries provided with inwardly extending pointed teeth 28 which are adapted to stick into the ends of the pumpkins. These upper and lower beveled pinions 26 and 27 are rotatably mounted upon upper and lower hollow shafts 29 which have their inner terminals beveled providing a cutting edge 30' for sticking into pumpkins.

These shafts 29 are secured in any preferred manner against movement in upper and lower casings 30 and 31 and these shafts extend entirely through these casings.

The means for rotating the pumpkin holding and grasping means C includes a pair of driven shafts 32 and 33 which are arranged in vertical longitudinal alignment. The terminals of these shafts 32 and 33 are rotatably mounted in suitable bearings 34 carried by the upper and lower casings 30 and 31 and these shafts are extended into the casings and are provided with beveled pinions 35 which mesh with the beveled pinions 26 and 27. The rear terminals of the shafts 32 and 33 are mounted in suitable bearings 36 carried by upper and lower rear gear casings 37 and 38. The rear terminals of these casings 37 and 38 have secured thereto in any preferred manner supporting arms 39 which are pivoted as at 40 to suitable brackets 41 bolted or otherwise secured to the main supporting post 25. Thus is can be seen that these shafts 32 and 33 are permitted to swing toward and away from each other for permitting the teeth 28 carried by the gear wheels 26 and 27 to be brought into and out of engagement with a pumpkin placed between the same. These shafts 32 and 33 are preferably housed within tubular casings 42, which are rigidly secured to the front upper and lower casings 30 and 31 and the rear casings 37 and 38. The inner terminals of the shafts 32 and 33 have keyed or otherwise secured thereto beveled pinions 43 and 44 which are engaged by beveled pinions 45 and 46 respectively. The beveled pinion 45 is keyed or otherwise secured to a solid shaft 47 which is supported in suitable bearings 48 carried by the upper casing 37. The lower end of the shaft 47 carries a substantially spherical shaped head 49 provided with gear teeth which are adapted to mesh with internal gear teeth formed in the hollow shaft 50 to which is keyed or otherwise secured the pinion 46. This shaft 50 extends entirely through the lower casing 38 and is rotatably mounted in suitable bearing 51, carried by said casing. The lower end of the hollow shaft 50 has positioned therein a substantial spherical head 52 which is provided with external gear teeth for engaging the internal gear teeth formed in the shaft 50 and this head is carried by a solid shaft 53 the lower end of which carries a second head 54 which meshes with suitable internal gear teeth carried by the hollow shaft 55. This shaft 55 is rotatably mounted in a suitable bearing 56 carried by the floor or other support to which the frame B is secured. The portions 55, 53, 50 and 47 constitute a single drive shaft, and this shaft is made up in the manner described so as to permit the same to give with the shafts 32 and 33 when the same are moved toward and away from each other. This shaft can be rotated in any preferred way, either by a suitable prime mover, or by a hand crank. As shown the tubular section or shaft 55 has keyed thereto a relatively large beveled gear wheel 57 which has meshing therewith a relatively small beveled gear wheel 58 which is keyed to the armature shaft 59 of an electric motor 60. By this construction it can be seen that the two beveled pinions 26 and 27 which act as supports for the pumpkin being peeled and halved, are driven at a constant and even rate of speed.

The means E for moving the pumpkin holding and grasping means C toward and away from each other includes an upper and a lower cylinder 61 and 62 and these cylinders are secured respectively to the plates 20 and 21 forming a part of the vertically disposed frame 18. Each of the cylinders 61 and 62 is divided by a central partition 63 which divides the same into an upper expansion chamber 64 and an inner contracting chamber 65, that is when pressure is admitted into the outer chambers 64 the pumpkin holding and grasping means are moved away from each other and when pressure is admitted into the inner chambers 65 the pumpkin holding and grasping members are moved toward each other. Piston rods 66 and 67 are provided for the cylinders 61 and 62 and extend entirely through the chambers 64 and 65, thereof. Each of the piston rods 66 and 67 extend outwardly of the partition walls 63 of the cylinders 61 and 62 and are provided with piston heads 68 and 69. Each of the cylinders 61 and 62 on opposite sides of the partitions 63 thereof are provided with ports 70 and 71, the purpose of which will be hereinafter more fully described. The inner ends of the piston rods 66 and 67 are provided with T heads 72 which are rockably mounted in suitable brackets 73 carried by the outer faces of the casings 30 and 31. Thus it can be seen that when movement is imparted to the piston rods 66 and 67 that the casings 30 and 31 with the supporting pinions 26 and 27 will be moved either toward or away from each other according to the direction of movement of said piston rods.

Each of the pistons 61 and 62 have secured thereto intermediate their ends slide casings 74 which have formed in their inner walls ports 75 and 76 which register respectively with the ports 70 and 71. The outer walls of the casings 74 have formed therein ports 77 and 78 which are in alignment with the ports 75 and 76. These casings support slide valves 79 which are of hollow construction and these slide valves at each side of the transverse center thereof are provided with ports 80 and 81 and 82 and 83. The ports 80 and 83 have connected therewith transversely extending outlet pipes 84 and 85 which communicate with the exterior of the slide valves and are adapted to be brought into alignment at different times with the ports 75 and 76 and with the ports 77 and 78, and these ports or tubes 84 and 85 constitute outlet ways or exhaust ports.

Each of the slide valves 79 have communicating therewith inlet pipes 86 the outer ends of which are connected by means of knuckle joints 87 with radially extending feed pipes 88 which extend from opposite sides of the distributor head 24 which will be now described.

The distributor head 24 includes a circular base plate 89 which is secured in any preferred manner to the supporting standard or post 23 and a spaced retaining ring 90. The ring 90 and circular plate 89 are secured together by rivets 91. The head 24 also includes the rotatable portion 92 which includes the circular or disc shaped outer wall 93, the annular side wall 94 and the annular supporting flange 95 which is disposed intermediate the disc shaped attaching plate 89 and the ring 90. This attaching flange 95 is provided with arcuate slots 96 which receive the rivets 91. It thus can be seen that this rotatable portion 92 can be turned in relation to the supporting disc 89. In order to prevent the leakage of pressure from the head 24, suitable packing rings 97 are disposed intermediate the attaching flange 95 and the attaching plate 89 and the ring 90. The head 24 has communicating therewith through the attaching disc plate 89 the feed pipe 98 which is adapted to extend from any suitable source of supply. It is to be understood that the pressure used for actuating the pistons in the cylinders 61 and 62 can either be compressed air, steam, or the like and if compressed air is used the feed pipe 98 leads to a suitable reservoir tank. The outer wall 93 of the rotatable portion 92 of the head 24 is provided with suitable polygonal extensions 99 on which is detachably secured the actuating crank 100 by means of which the head can be readily turned.

When it is desired to move the pinions 26 and 27 toward each other for grasping a pumpkin the crank 100 is rotated in one direction for moving the slide valves 79 in such a direction that the ports 81 and 80 will be moved into registration with the ports 70 and 71 and it can be seen that pressure will be emitted through the port 81 from the slide valve into the chamber 65 and that any pressure in the chamber 64 will be permitted to escape through the port 80 and tube 84 to the atmosphere. The entrance of pressure into the chamber 65 will push in the inner pistons 69 and thus move the piston rods 66 and 67 inwardly and force the pinion wheels 26 and 27 toward each other and the pins 28 carried thereby into engagement with the pumpkin. It is to be understood of course that during the rotation of the rotatable port 92 of the head 24 that the pipes 88 will be turned with the rotatable portion thus moving the pipes 86 and actuating the slide valves.

Now when it is desired to move the pinions 26 and 27 away from each other the crank 100 is moved in a reverse direction which will slide the slide valve 79 in a reverse direction and move the ports 82 and 83 into registration with the ports 70 and 71. This will permit pressure to escape from the chambers 65 and pressure enter into the chambers 64. The pressure entering into the chambers 64 will act upon the pistons 68 and thus move the piston rods 66 and 67 outwardly and move the pinions 26 and 27 away from the pumpkin and permit the pumpkin to be removed from the apparatus.

The pumpkin peeling device F constitutes the main peeling element and includes the arcuate supporting plate 101 which has its terminals connected to supporting arms 102. These arms are rotatably mounted upon a suitable supporting rod 103, which is secured to the supporting standard 23. The arcuate plate 101 carries an actuating handle 104, whereby the said plate can be readily swung toward or away from the pumpkin which is to be peeled. This plate 101 supports a plurality of knives 105 which are utilized for peeling the pumpkin. Each of these knives include an arcuate resilient shank 106, and a peeling blade portion 107 which is secured in spaced parallel relation to the shank 106. The cutting or peeling blade 107 is secured by means of side flanges 108 to the shank 106 and the sharpened edge thereof is preferably bent outwardly away from the shank as at 109.

These peeling members 105 are carried in a novel manner by the plate 101 and as shown each of the shanks 106 are secured to a sliding rod 110, that are carried by bearings 111 formed on the plate 101. Expansion springs 112 are coiled about the sliding rods and engage respectively stop pins 113 and the inner face of the plate 101. In order to limit the sliding movement of the rods 110 inwardly the outer ends of the rods should also be provided with stop pins 114. It can be seen that this peeling section F engages a relatively wide area of surface of the pumpkin intermediate the gear wheels or pinions 26 and 27 and if the pumpkin is of a relatively small size this peeling section will peel substantially the entire pumpkin.

The peeling members G are used for the pumpkins which are of a relatively large size and are arranged above and below the main peeling section F and are secured respectively to the casings 30 and 31. These peeling members G each include an outwardly extending supporting arm 115 to which is secured a plurality of peeling knives 105 as heretobefore described. The arms 115 are pivotally secured into position by means of pins 116 which extend into the casings 30 and 31. By this construction it can be seen that the peeling sections G can be moved into and out of engagement with the pumpkin and in order to hold the peeling sections G in their operative or inoperative positions suitable leaf springs 117 are secured within the casings 30 and 31 and engage the flat tined ends or feet 118 formed on the arms 115. The peeling sections H are provided for peeling the pumpkins at the terminals thereof inwardly of the periphery of the supporting pinions 26 and 27 and each of these peeling sections include a rigid arm 119 which is secured to a suitable collar 120 which can be keyed or otherwise secured to the hollow stationary shafts 29. These arms 119 have secured thereto peeling knives 120 which are formed exactly like the peeling knives 105.

It can be seen that all of the peeling knives are held stationary during rotation of the pumpkin so that the pumpkin will be effectively peeled and in actual practice it will be merely necessary to rotate the pumpkin once in order to peel the entire area thereof.

The halving device I includes an arcuate shaped knife 125 which is secured in any preferred manner to the supporting plate 101 of the main peeling section F. This knife 125 is provided with cutting edge 126 and the knife is of sufficient length to cut entirely through rind of the pumpkin.

In operation of the improved pumpkin peeling and halving machine a pumpkin is grasped and placed intermediate the pinions 26 and 27 and the handle 100 is actuated as heretobefore described for moving the teeth 28 carried by said gear wheels or pinions 26 and 27 into engagement with the pumpkin. The handle 104 of the peeling section F is then engaged and this peeling section is swung into engagement with the periphery of the pumpkin and maintained in that position by the operator if so desired. It can be seen that when the peeling section F is swung into place that the knife 125 will be forced into the pumpkin. If the pumpkin is of a rather large size the peeling sections G are moved into engagement with the pumpkin. The motor 60 is now set into operation and the pumpkin will be rotated by pinions 26 and 27. During the rotation of the pumpkin the knives 105 carried by the various peeling sections will effectively peel the pumpkin and the knife 125 will cut the pumpkin in two.

The halves of the pumpkin can now be removed from the machine by actuating the crank 100 in a reversed direction as heretofore described for moving the pinions 26 and 27 away from each other. The pumpkins can be moved to another table for permitting the same to be seeded and otherwise cleaned.

From the foregoing description it can be seen that an improved pumpkin peeling and halving device has been provided which is of exceptionally simple and durable construction and which will permit a maximum number of pumpkins to be peeled and halved by a single person.

Changes in details may be made without departing from the spirit or scope of this invention, but what I claim as new is—

1. In a vegetable paring device, means for engaging the opposite ends of the vegetable to be pared, means for moving said vegetable engaging means into and out of engagement with a vegetable, means for rotating said members in the same direction, paring knives non-rotatably mounted, and movable into and out of engagement with the vegetable to be pared.

2. In a vegetable paring device, a pair of pinions, a plurality of vegetable engaging teeth carried by the pinions, means for moving the pinions toward and away from each other, a prime mover, means for rotating the pinions in the same direction from the prime mover, a peeling section including a plurality of peeling knives movable toward and away from the vegetable to be pared, and a halving knife carried by said peeling section.

3. In a vegetable paring device, a pair of beveled pinions disposed in superposed relation, a plurality of vegetable engaging pins carried by the facing portions of said pinions, a pair of swinging drive shafts, means operatively connecting the shafts with the pinions, means for synchronously rotating the shafts, and non-rotatable peeling knives movable toward and away from the vegetable to be pared.

4. In a vegetable paring device, a pair of movable pinions disposed in superposed relation, a plurality of vegetable engaging pins carried by the facing portions of said pinions, a pair of superposed driven shafts, means operatively connecting the driven shafts with the pinions, a drive shaft operatively connected with the driven shafts, a prime mover, means operatively connecting the prime mover with the drive shaft, means hingedly supporting the driven shafts for permitting the pinions to move toward and away from each other, means for positively moving the pinions toward and away from each other; and a plurality of peeling sections movable toward and away from the vegetable to be pared.

5. In a vegetable paring machine, a pair of superposed pinions, a plurality of pins arranged in annular formation carried by the facing portions of said pinions for engaging and supporting the vegetable to be pared, casings rotatably supporting said pinions, a pair of driven shafts extending into said casings and operatively connected with the pinions, a pair of tubular casings supporting said driven shafts and connected with the first mentioned casings, means pivotally connecting the tubular casings in position, a sectional driving shaft operatively connected to the driven shafts, a motor, means operatively connecting the motor with the sectional driving shaft, and positive means for moving the first mentioned casings toward and away from each other.

6. In a vegetable paring machine a pair of superposed vegetable engaging members, means carried by said members for engaging the vegetable, means for rotating said members, a pair of superposed cylinders arranged on the outer sides of said members, piston rods slidably mounted in said cylinders, means operatively connecting the piston rods with said members, means for controlling the movement of the piston rods in the cylinders for moving the members toward and away from the vegetable being halved.

7. In a vegetable paring device, a pair of superposed vegetable engaging members, means for rotating said members, a pair of cylinders disposed at the opposite ends of said members, pistons slidably mounted in said cylinders, piston rods secured to said pistons and to said vegetable engaging members, slide valves operatively connected to the cylinders, a distributing head, means for rotatably supporting the distributor head, pipes operatively connected with the head and slide valves, means for rotating the head for moving said slide valves, and vegetable peeling knives movable toward and away from the vegetable to be pared.

8. In a vegetable peeling and halving machine, means for supporting and rotating the vegetable, non-rotatable peeling knives movable toward and away from the vegetable to be pared, and a stationary halving knife adapted to engage the vegetable during rotation thereof.

9. In a vegetable paring and halving device a pair of superposed vegetable engaging members, means for rotating said members, means for moving the members toward and away from each other, a plurality of peeling sections movable toward and away from the vegetable to be pared, and each section including a plurality of resiliently mounted knives 10. In a vegetable paring machine, a pair of superposed vegetable supporting members, means for rotating said members, means for moving the members toward and away from each other, a main vegetable paring section, a pair of end vegetable paring section members movable toward and away from the vegetable to be pared, each of said members including a plurality of resiliently mounted knives, and a swinging halving knife associated with one of said members.

11. In a vegetable peeling device, means for rotating and supporting a vegetable to be pared, a peeling section including an arcuate supporting plate movable toward and away from the vegetable to be pared, means for pivotally supporting said plate, and a plurality of resiliently supported knives connected with said plate, and means for permitting the knives to be moved inwardly in relation to said plate to conform to the configuration of the vegetable being pared.

12. In a vegetable paring machine, means for rotating and supporting the vegetable to be pared, a central peeling section including an arcuate plate, means hingedly supporting the plate for permitting the same to be moved toward and away from the vegetable to be pared, a plurality of peeling knives including resilient shanks, means for slidably and resiliently connecting the shanks to the arcuate plate and a halving knife carried by said plate.

13. In a vegetable paring device, a pair of vegetable supporting members, means for rotating said members, means for moving said members toward and away from each other, a main central peeling section, end peeling sections, and intermediate peeling sections, means for moving the central and intermediate peeling sections toward and away from the vegetable to be pared, each of said sections including a plurality of paring knives.

14. In a vegetable paring device, a pair of pinions disposed in superposed relation, means for rotating said pinions, a pair of hollow tubular shafts supporting said pinions, a plurality of annular disposed pins carried by the facing portions of said pinions for engaging the vegetable to be pared, and peeling knives secured to said shafts and disposed inwardly of the periphery of said pinions for engaging the opposite ends of the vegetable to be pared.

15. In a vegetable paring device, a paring knife including a resilient shank, a blade carried by said shank disposed in spaced parallel relation thereto, means securing the blade to the shank, the cutting edge of said blade being outturned.

HENRY SLETTO.